United States Patent [19]

Furukawa et al.

[11] Patent Number: 4,523,633
[45] Date of Patent: Jun. 18, 1985

[54] HEATER UNIT FOR AUTOMOTIVE VEHICLES, PERMITTING EASY REMOVAL AND FITTING OF HEATER CORE FROM AND INTO CASING

[75] Inventors: Kenji Furukawa; Shinji Wakabayashi, both of Saitama, Japan

[73] Assignee: Diesel Kiki Co., Ltd., Saitama, Japan

[21] Appl. No.: 484,570

[22] Filed: Apr. 13, 1983

[30] Foreign Application Priority Data

Apr. 30, 1982 [JP] Japan ............................ 57-63958[U]

[51] Int. Cl.³ .............................................. F28F 7/00
[52] U.S. Cl. ......................................... 165/76; 165/41; 237/12.3 B
[58] Field of Search ............... 165/41, 76; 237/12.3 B; 62/244, 298

[56] References Cited

U.S. PATENT DOCUMENTS 3,026,042 3/1962 Zoltok ............................ 237/12.3 B
3,990,636 11/1976 Laing ............................. 237/12.3 B
4,108,376 8/1978 Matsuda et al. ............... 237/12.3 B

FOREIGN PATENT DOCUMENTS 3204381 8/1982 Fed. Rep. of Germany ... 237/12.3 B
3229866 2/1984 Fed. Rep. of Germany ........ 165/41
2512749 3/1983 France .................................... 165/41
141917 8/1983 Japan ..................................... 165/41
2067735 7/1981 United Kingdom .................. 165/76

Primary Examiner—Edward G. Favors
Assistant Examiner—Steven E. Warner
Attorney, Agent, or Firm—Frishauf, Holtz, Goodman & Woodward

[57] ABSTRACT

A casing accommodating the heater core comprises a main body formed by first and second casing elements joined together at their peripheral edges, and a third casing element detachably joined to the main body and formed with hot air outlets. Part of the peripheral edges of the first and second casing elements cooperate to define an opening at which the third casing element is joined to the main body. The opening is exposed to the outside when the third casing element is detached from the main body, and through which the heater core can be removed from and fitted into the casing with ease.

3 Claims, 3 Drawing Figures

HEATER UNIT FOR AUTOMOTIVE VEHICLES, PERMITTING EASY REMOVAL AND FITTING OF HEATER CORE FROM AND INTO CASING

BACKGROUND OF THE INVENTION

This invention relates to heater units for use in automotive vehicles, and more particularly to a heater unit of this kind which permits easy removal and fitting of the heater core from and into the casing.

In a conventional heater unit of this kind, the casing, in which the heater core is accommodated, is arranged at a front side of the compartment of an automotive vehicle equipped with the heater unit. A conventional type of such casing has a structure which can be splitt into two parts laterally of the compartment, and in which the heater core is placed in a manner completely enclosed by the casing. Another conventional type has a structure formed with a lateral opening through which the heater core can be removed from and fitted into the casing.

According to these conventional type heater casings, to remove the heater core from the casing for the purpose of replacement with a new one, repair, etc., in the above first-mentioned type the whole heater unit has to be removed from its installed location and then dismantled for removal of the heater core from the casing, while in the last-mentioned type, the removal of the heater core from the casing is difficult in the case where peripheral parts such as a cooling unit are arranged at the lateral side of the casing formed with the above opening, also requiring removal of the whole heater unit from its installed location.

Thus, the conventional type heater units require a very troublesome operation for removal and fitting of the heater core from and into the casing.

SUMMARY OF THE INVENTION

It is an object of the invention to provide a heater unit for use in an automotive vehicle which permits easy removal and fitting of the heater core from and into the casing.

It is another object of the invention to provide a heater unit which can be fitted to any compartment configurations of various types of automotive vehicles, without requiring any substantial change to the exterior configuration of the main body of the casing.

The present invention provides a heater unit for automotive vehicles, which comprises: a heater core; a casing accommodating the heater core, and comprises first, second and third casing elements joined together at their peripheral edges. The first and second casing elements cooperatively form a main body of the casing, and the third casing element is formed with at least one hot air outlet. The third casing element is joined to the main body in a manner detachable therefrom. The peripheral edges of the first and second casing elements have part thereof cooperating to define an opening through which the heater core can be removed from and fitted into the main body. The third casing element has part of its peripheral edge joined to the above part of the peripheral edges of the first and second casing elements forming the opening.

The above and other objects, features and advantages of the invention will be more apparent from the ensuing detailed description taken in conjunction with the accompanying drawings.

DETAILED DESCRIPTION

The invention will now be described in detail with reference to the drawings.

Figure 1:
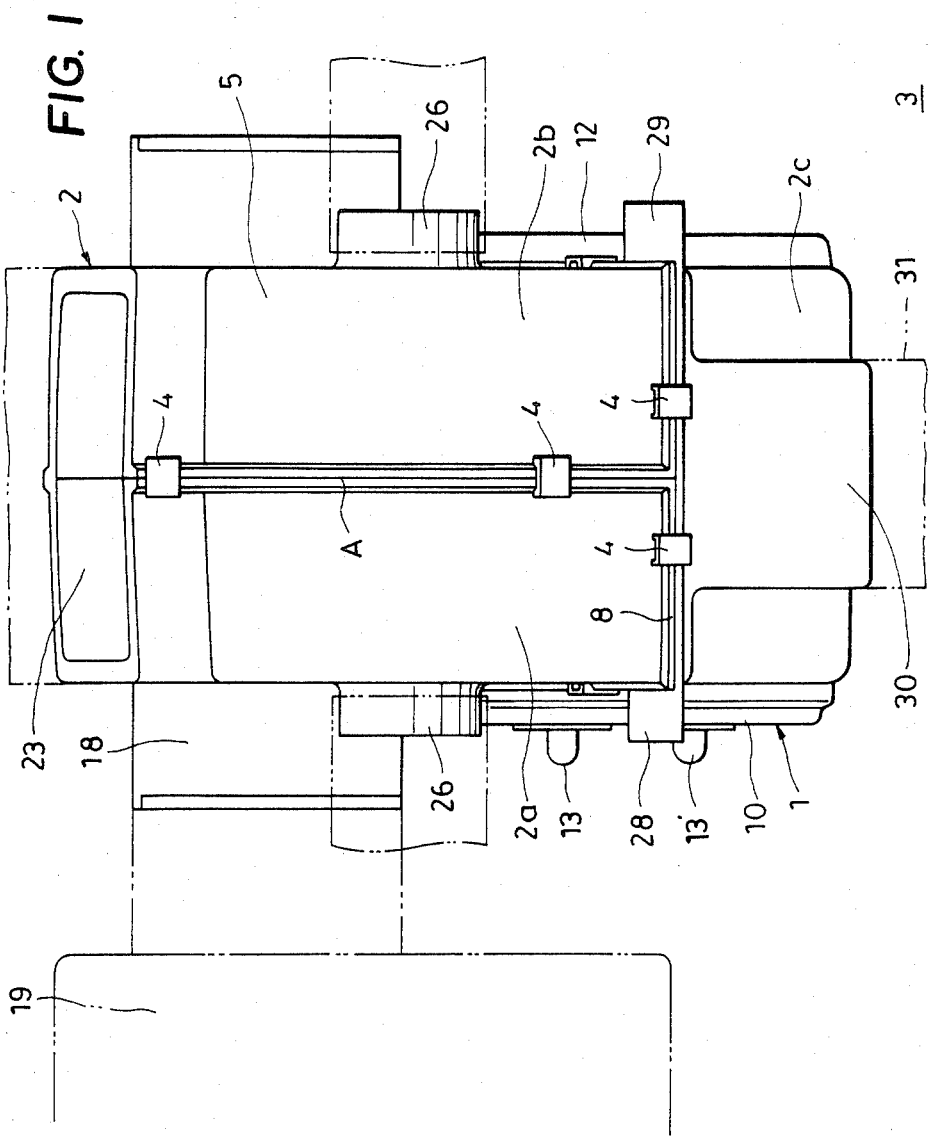
FIG. 1 is a front view of a heater unit for vehicles according to one embodiment of the present invention.
Figure 2:
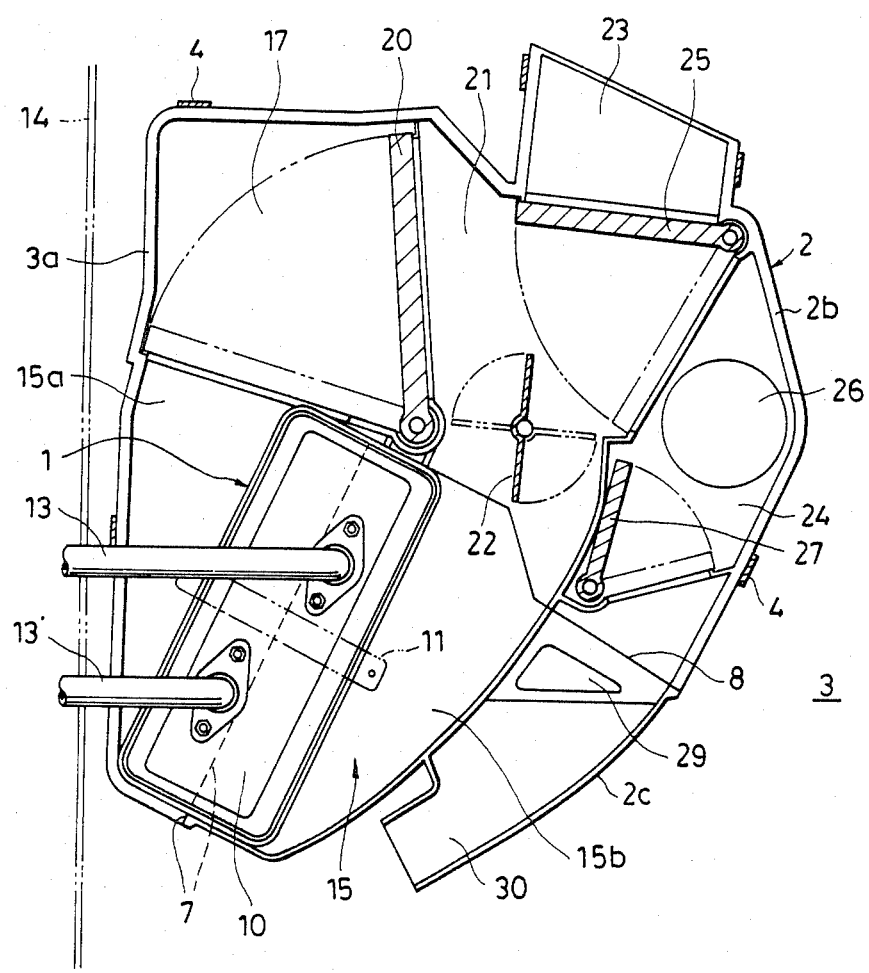
FIG. 2 is a longitudinal sectional view of the heater unit of FIG. 1.
Figure 3:
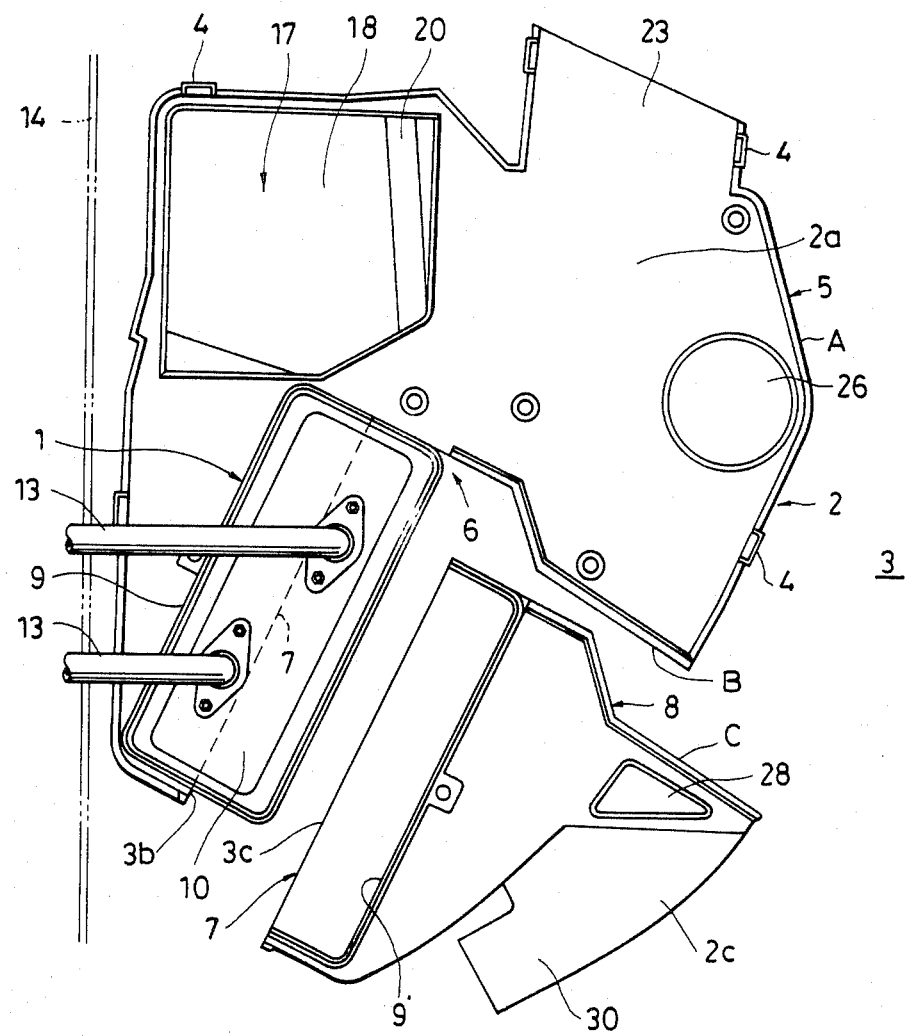
FIG. 3 is a lateral side view of the heater unit of FIG. 1, with the third casing element removed from the main body.

Referring to FIGS. 1 through 3, there is illustrated a heater unit according to an embodiment of the invention. The heater unit illustrated is adapted to be installed on a front wall of the compartment 3 of an automotive vehicle, at a central location in the transverse direction and below an instrument panel on the same wall. A heater casing 2 in which a heater core 1 is accommodated is formed of three splittable parts, that is, a first casing element 2a located at a left-hand side of the compartment 3 of the automotive vehicle, a second casing element 2b located at a right-hand side of same, and a third casing element 2c located at a front side (i.e. on the compartment side) of the casing and at a lower level than the other casing elements. The first and second casing elements 2a, 2b are substantially symmetrical in shape with each other, and abut against each other at their peripheral edges A at a central part of the casing 2 and secured together by means of several clamping pieces 4, thus cooperatively forming a main body 5 of the casing (hereinafter called "the main casing body").

The main casing body 5 is formed with an opening 6 facing toward the compartment 3, with its open surface directed obliquely. The peripheral edge of the opening 6 forms part of further joining peripheral edges B along which the first and second casing elements 2a, 2b are joined with the third casing element 2c. That is, also the third casing element 2c has a joining peripheral edge C corresponding in size and shape to the above joining peripheral edges B so that the third casing element 2c can be detachably joined to the main casing body 5 with their joining edges B, C abutting against each other and secured together by means of further clamping pieces 4.

The above joining peripheral edges B, C comprise a longitudinal boundary portion 7 extending longitudinally or vertically of the heater core 1 along a radially central line of same, and a transverse boundary portion 8 extending from an upper end of the longitudinal boundary portion 7 forwardly and obliquely at substantially right angles thereto. The main casing body 5 and the third casing element 2c have their inner surfaces formed, respectively, with first and second fitting grooves 9 and 9' located at opposite sides of the longitudinal boundary portion 7 and extending parallel therewith. These fitting grooves 9, 9' both have flat bottom surfaces and abutting against each other on a flush level along the longitudinal boundary portion 7 and cooperatively receive a tank 10 of the heater core 1 in a manner fitted therein and held therebetween. In this state, the above tank 10 is retained on an inner surface of the heater casing 2 by means of a retainer band 11 fixed to both of the main casing body 5 and the third casing element 2c on their outer surfaces. On the other hand, the second casing element 2b of the main casing body 5 and the third casing element 2c at the other or opposite side of the casing 2, to which is opposed the other or opposite tank, not shown, of the heater core 1, cooperate to form a tank fitting portion 12 formed with a longitudinal boundary portion, a transverse boundary portion and fitting grooves similar to the above-mentioned ones 7, 8, 9 and 9', and the above other tank is fitted within the tank fitting portion 12 in a manner held between the main casing body 5 and the third casing element 2c, i.e. in a manner similar to that described above. Therefore, the whole heater core 1 has its opposite tanks supportedly held between the main casing body 5 and the third casing element 2c. By virtue of this construction, if a heater core having a larger size is required in a cold place for instance, it suffices to design the third casing element 2c alone to have a correspondingly increased size, without varying the size of the main casing body 5.

Connected at one ends to the above one tank 10 of the heater core 1 are a hot water inlet pipe 13 and a hot water outlet pipe 13' which extend through a fire board 14 separating the compartment from the engine room and are connected at the other ends to the engine, not shown, of the vehicle, to effect supply and discharge of engine cooling water to and from the heater core 1. The heater core 1 has an intermediate heat exchange portion, not shown, arranged across an air heating passage 15 formed within the casing 2.

The air heating passage 15 comprises an upstream portion 15a formed in the main casing body 5 at the inlet side of the heater core 1 and a downstream portion 15b formed in the third casing element 2c at the outlet side of same. The upstream portion 15a of the air heating passage 15 communicates with an air inlet chamber 17 formed in the main casing body 5 at an upper location, which communicates with the interior of a cooling unit 19 arranged at a lateral side of the heater unit, by way of an air inlet connector 18 provided on the first casing element 2a.

The main casing body 5 is formed therein with an air mixing chamber 21 at a location immediately in front of the air inlet chamber 17, and communicates, on one hand, with the same chamber 17, and, on the other hand, with the downstream portion 15b of the air heating passage 15, respectively. An air-mix damper 20 is disposed for pivotal movement about its fulcrum located immediately above the heater core 1, which has its angular position varied as it is pivotally moved to adjust the ratio in amount between the intake air in the air inlet chamber 17 guided into the air heating passage 15 and the same air guided into the air mixing chamber 21, thereby controlling the discharge air temperature. An auxiliary damper 22 is arranged at the junction of the air mixing chamber 21 with the downstream portion 15b of the air heating passage 15, which is movable in unison with the air-mix damper 20 to prevent a backflow of air from the air mixing chamber 21 to the heater core 1 during maximum cooling mode operation. A downstream portion of the air mixing chamber 21 divides into a vent passage 23 which is to be connected to a vent air outlet, not shown, and a hot air passage 24, at a junction of which is arranged a fulcrum of a mode damper 25 which is pivotable about the same fulcrum to selectively close either the vent passage 23 or the hot air passage 24.

The hot air passage 24 comprises an upstream portion formed in the main casing body 5 and a downstream portion in the third casing element 2c, respectively. The upstream portion of the hot air passage 24 is formed with a defrosting air passage 26 which is to be connected to a defrosting air outlet, not shown. A changeover damper 27 is arranged in the upstream portion of the hot air passage 24 at a location immediately downstream of the inlet end of the defrosting air passage 26, to selectively assume a defrosting mode position for guiding discharge air to the defrosting air passage 26 alone or a heater mode position for guiding discharge air downward. The downstream portion of the hot air passage 24 is formed with lateral hot air outlets 28, 29 opening in opposite lateral side surfaces of same, and a lower hot air outlet 30 opening in a lower end face of same. The lower hot air outlet 30 is to be connected to a duct 31 indicated by the two-dot chain line in FIG. 1, leading to a discharge air outlet, not shown, which is arranged to open in a rear seat location of the compartment.

As noted above, the hot air outlets 28-30 are formed in the third casing element 2c, whereas the dampers 20, 22, 25 and 27 are formed in the main casing body 5, but not in the third casing element 2c. The hot air outlets 28-30 are designed to have suitable shapes and locations in accordance with the type of an automotive vehicle applied, the air discharging locations, etc. For example, the shape and location of the left-hand or right-hand hot air outlet 28 or 29 are designed depending upon the location of the accelerator pedal, the location of which is different between a left-hand steering vehicle and a right-hand steering vehicle. In economy-type automotive vehicles which usually do not require guiding hot air to a rear seat location of the compartment, the lower hot air outlet 30 may be omitted or covered with a cap.

The manner of removing and fitting the heater core 1 from and into the casing 2 is as follows: First, the clamping pieces 4 clamping the third casing element 2c and the main casing body 5 together and the retainer band 11 tying the tanks of the heater core 1 to the casing 2 are removed. The third casing element 2c can then be detached from the main casing body 5 by drawing same toward the compartment, as shown in FIG. 3. Then, the opening 6 and accordingly the front side of the heater core 1 become exposed to the compartment and accessible therefrom. By this time, the hot water inlet and outlet pipes 13, 13', which are accessible from the engine room, are previously disconnected from the engine. Therefore, the heater core 1 can be moved toward the compartment by pulling same. After this, the heater core repaired or inspected or a new one is fitted into the casing 2c in a manner just reverse to that described above. Thus, the operation for removal and fitting can be carried out with much ease. During this operation, since the third casing element 2c is devoid of any of the dampers 20, 22, 25 and 27, it is not necessary at all to remove the actuators or links for driving same.

Although in the illustrated embodiment the heater core 1 is accommodated within the casing 2 with its tanks held between the main casing body 5 and the third casing element 2c, alternatively the whole heater core 1 including the tanks may be completely received within the main casing body 5.

While a preferred embodiment has been described, variations thereto will occur to those skilled in the art within the scope of the present inventive concepts which are delineated by the following claims.

What is claimed is:

1. A heater unit for an automative vehicle, comprising:
   a heater core;
   a casing accommodating said heater core therein, said casing comprising first, second and third casing elements joined together at peripheral edges thereof, said first and second casing elements cooperating to form a main body of said casing, said third casing element having at least one hot air outlet formed therein, said third casing element being detachable from said first and second casing elements, said peripheral edges of said first and second casing elements having part thereof forming in cooperation an opening for removal and fitting of said heater core from and into said main body of said casing therethrough, and said third casing element having a peripheral edge joined in part with said part of said peripheral edges of said first and second casing elements forming said opening;

a passage formed in said main body of said casing for heating intake air, said heater core being arranged across said passage;

an air mixing chamber formed in said main body of said casing for mixing intake air with hot air from said passage;

a first damper disposed in said main body of said casing for adjusting the ratio in amount between intake air guided into said passage and one guided into said air mixing chamber;

at least one air outlet opening formed in said main body of said casing, said at least one air outlet opening being other than said at least one hot air outlet of said third casing element; and a second damper disposed in said main body of said casing for selectively guiding air from said air mixing chamber into said at least one air outlet opening and said at least one hot air outlet; and said third casing element has substantially solely said at least one hot air outlet formed therein.

2. A heater unit for an automotive vehicle, comprising:

a heater core;

a casing accommodating said heater core therein, said casing comprising first, second and third casing elements joined together at peripheral edges thereof, said first and second casing elements cooperating to form a main body of said casing, said third casing element having at least one hot air outlet formed therein, said third casing element being detachable from said first and second casing elements, said peripheral edges of said first and second casing elements having part thereof forming in cooperation an opening for removal and fitting of said heater core from and into said main body of said casing therethrough, and said third casing element having a peripheral edge joined in part with said part of said peripheral edges of said first and second casing elements forming said opening;

said heater core including a pair of opposite tanks;

said joined peripheral edges of said main body of said casing and said third casing element including at least one boundary portion extending longitudinally of said heater core along a radially intermediate line thereof; and said main body of said casing and said third casing element having inner surfaces formed therein with first and second fitting grooves, respectively, said first and second fitting grooves being located at opposite sides of said boundary portion and extending parallel therewith, a corresponding one of said opposite tanks of said heater core being fitted in said fitting grooves in a manner held therebetween.

3. A heater unit for an automotive vehicle, the automotive vehicle having a compartment, said heater unit comprising:

a heater core; and a casing accommodating said heater core therein, said casing comprising first, second and third casing elements joined together at peripheral edges thereof, said first and second casing elements cooperating to form a main body of said casing, said third casing element having at least one hot air outlet formed therein, said third casing element being detachable from said first and second casing elements, said peripheral edges of said first and second casing elements having part thereof forming in cooperation an opening for removal and fitting of said heater core from and into said main body of said casing therethrough, and said third casing element having a peripheral edge joined in part with said part of said peripheral edges of said first and second casing elements forming said opening;

said casing being disposed in said vehicle compartment such that said third casing element is located at a side of said casing facing said compartment, whereby said opening formed by said first and second casing elements is exposed to said compartment and is accessible therefrom when said third casing element is detached from said first and second casing elements of said main body of said casing.

* * * * *